US007821779B2

(12) United States Patent
Daley, III

(10) Patent No.: US 7,821,779 B2
(45) Date of Patent: Oct. 26, 2010

(54) BAG COMPUTER ASSEMBLY WITH EXPOSABLE CONTROL SURFACE

(76) Inventor: Charles A. Daley, III, P.O. Box 184, Karon P.O., T. Karon, A. Muang, Phuket (TH) 83100

( * ) Notice: Subject to any disclaimer, the term of this patent is extended or adjusted under 35 U.S.C. 154(b) by 62 days.

(21) Appl. No.: 12/322,282

(22) Filed: Feb. 2, 2009

(65) Prior Publication Data

US 2009/0141446 A1    Jun. 4, 2009

Related U.S. Application Data

(63) Continuation-in-part of application No. 11/796,920, filed on May 1, 2007, now abandoned.

(60) Provisional application No. 61/067,201, filed on Feb. 27, 2008, provisional application No. 61/125,861, filed on Apr. 30, 2008.

(51) Int. Cl.
    *H05K 5/00*    (2006.01)
(52) U.S. Cl. .............................. 361/679.02; 361/679.21; 361/679.27; 361/679.08; 361/727; 248/917
(58) Field of Classification Search ............ 361/679.02, 361/679.21, 679.2, 679.08, 727, 679.27; 248/917–924; 206/320
See application file for complete search history.

(56) References Cited

U.S. PATENT DOCUMENTS

| 7,366,925 | B2 * | 4/2008 | Keely et al. ................. 713/300 |
| 7,539,011 | B2 * | 5/2009 | Shih et al. .............. 361/679.26 |
| 2005/0103815 | A1 * | 5/2005 | Lee et al. ..................... 224/275 |
| 2007/0199844 | A1 | 8/2007 | Daley, III |
| 2007/0201201 | A1 | 8/2007 | Daley, III |
| 2008/0192421 | A1 | 8/2008 | Daley, III |
| 2008/0273298 | A1 | 11/2008 | Daley, III |
| 2009/0009476 | A1 | 1/2009 | Daley, III |

\* cited by examiner

*Primary Examiner*—Jayprakash N Gandhi
*Assistant Examiner*—Ingrid Wright

(57) ABSTRACT

The Bag Computer Assembly with Exposable Control Surface is a panel-like computer with mounting attachments to allow it to be pivotally attached to a bag so that it may be stored flat against the bag front or pivoted out on one computer edge so that the display on the computer's front is in the line of sight of the operator/wearer for use. In addition, the computer is comprised of two panel-like parts which slide relative to each other and allow a control surface, with keyboard, electronic write pad or other controls, to be exposed for use when needed. The back side of the computer may have controls so there is no need to reduce display size because of controls. There may be a bag with mounting attachments to match the computer's mounting attachments and these both attach the bag and computer and allow them to pivot for storage and use.

16 Claims, 8 Drawing Sheets

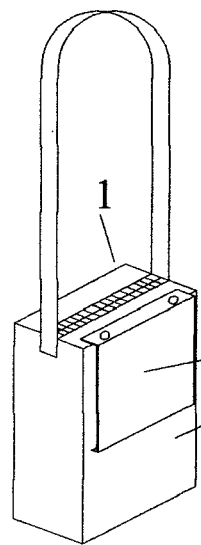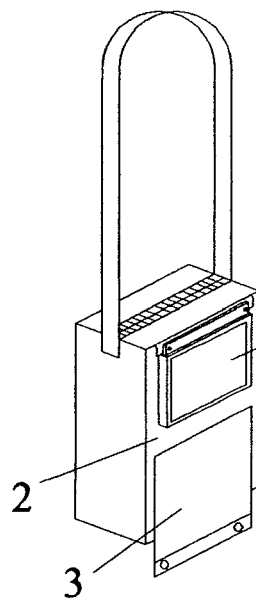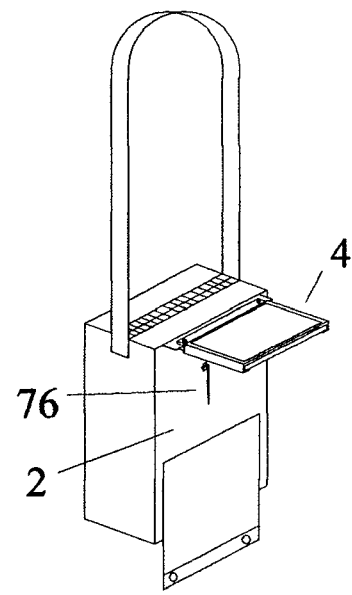
FIG 1          FIG 2          FIG 3
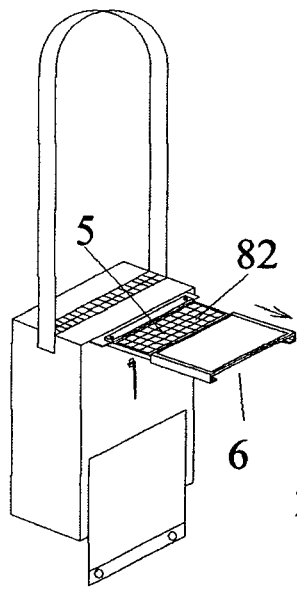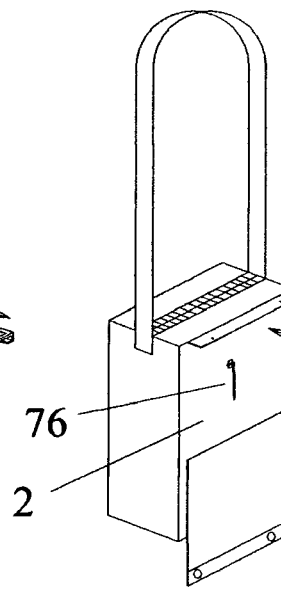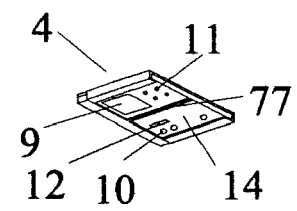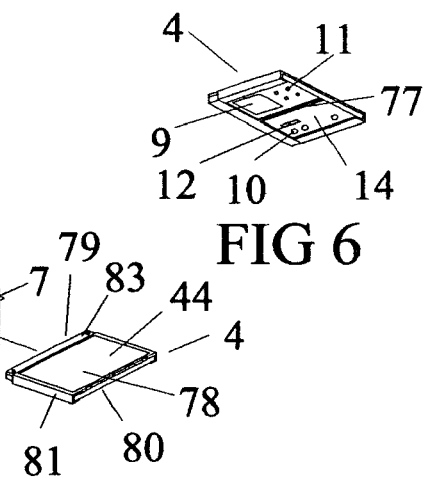
FIG 4          FIG 5          FIG 6

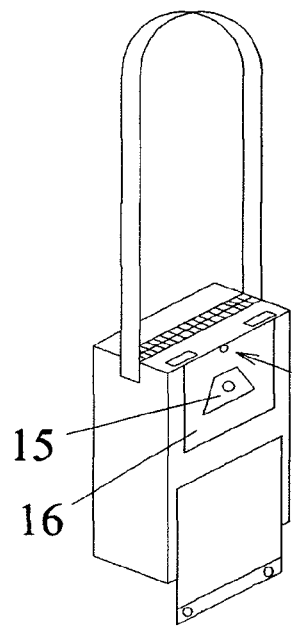
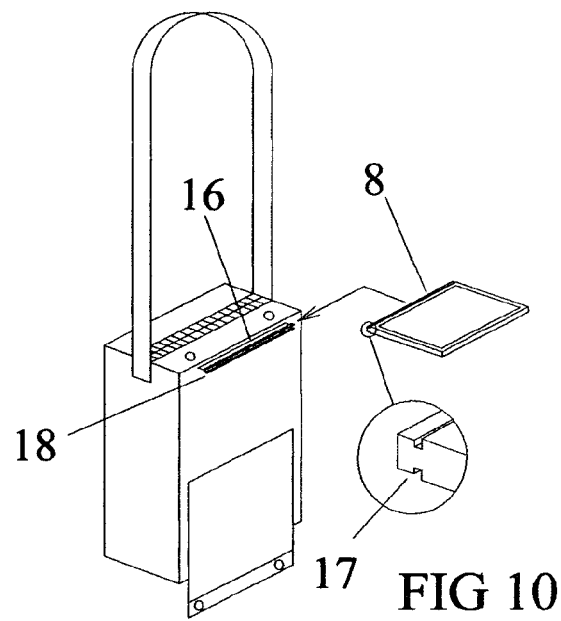
FIG 7  FIG 8  FIG 9  FIG 10
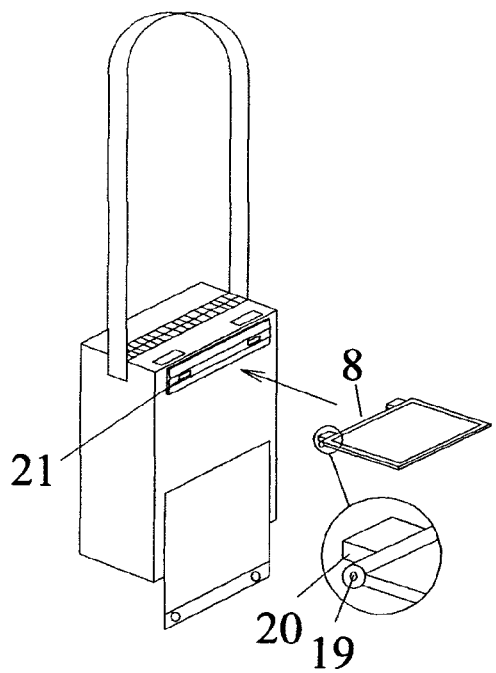
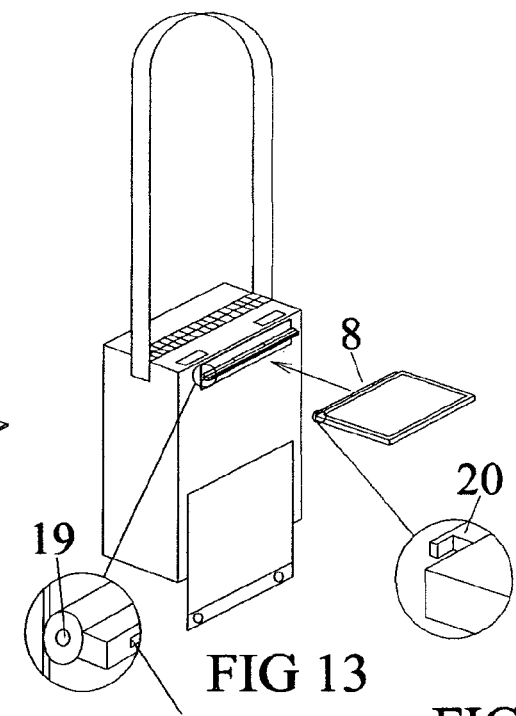
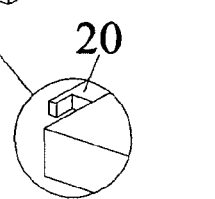
FIG 11  FIG 12  FIG 13  FIG 14  FIG 15

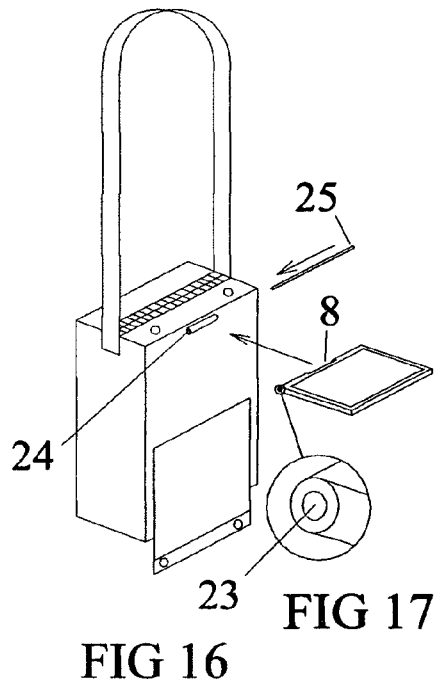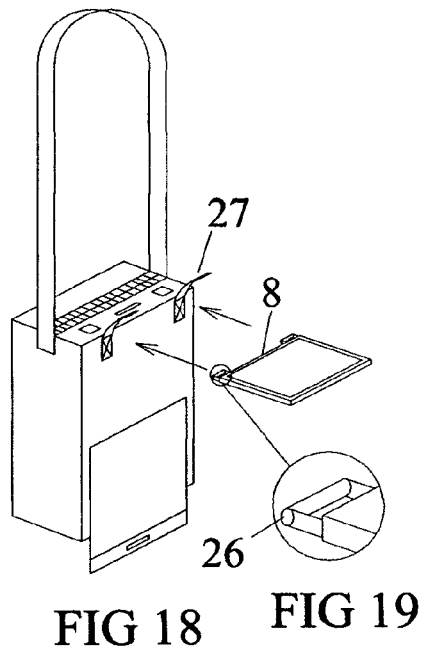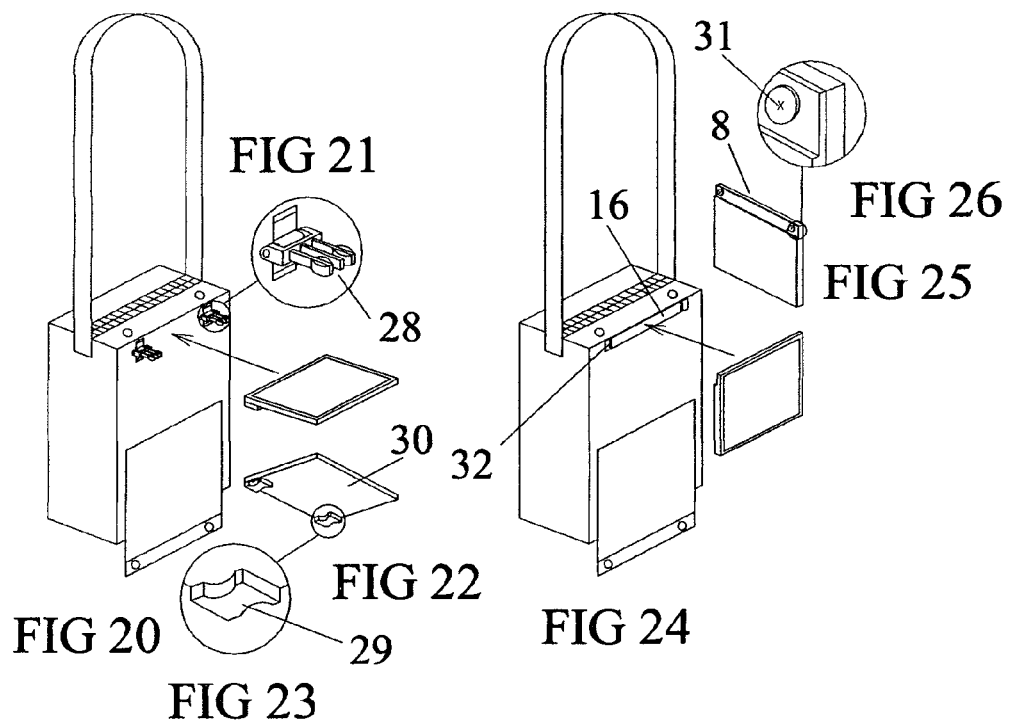

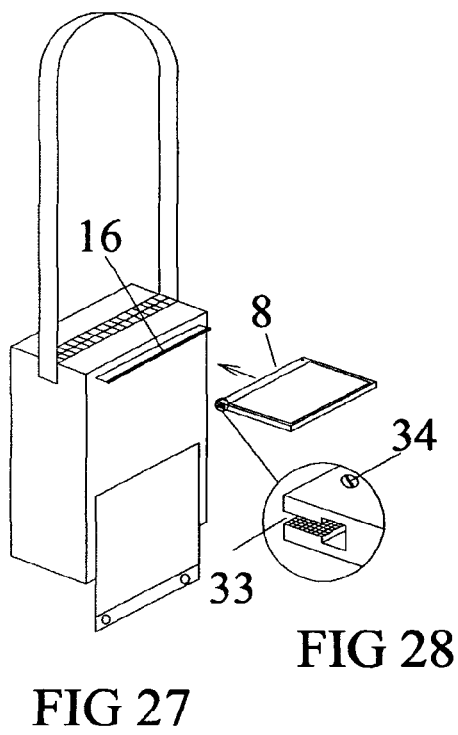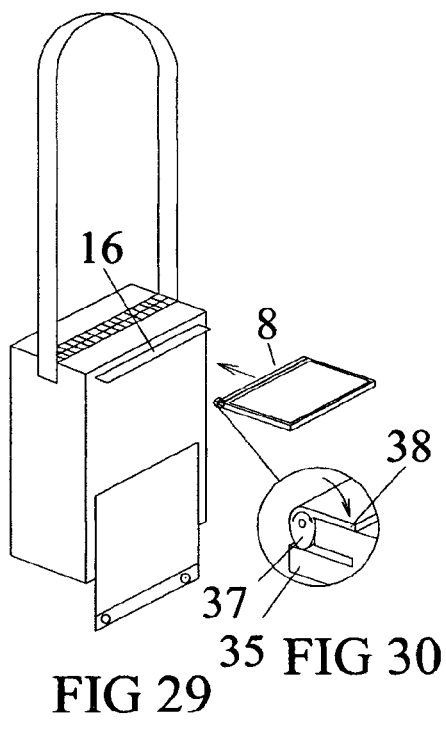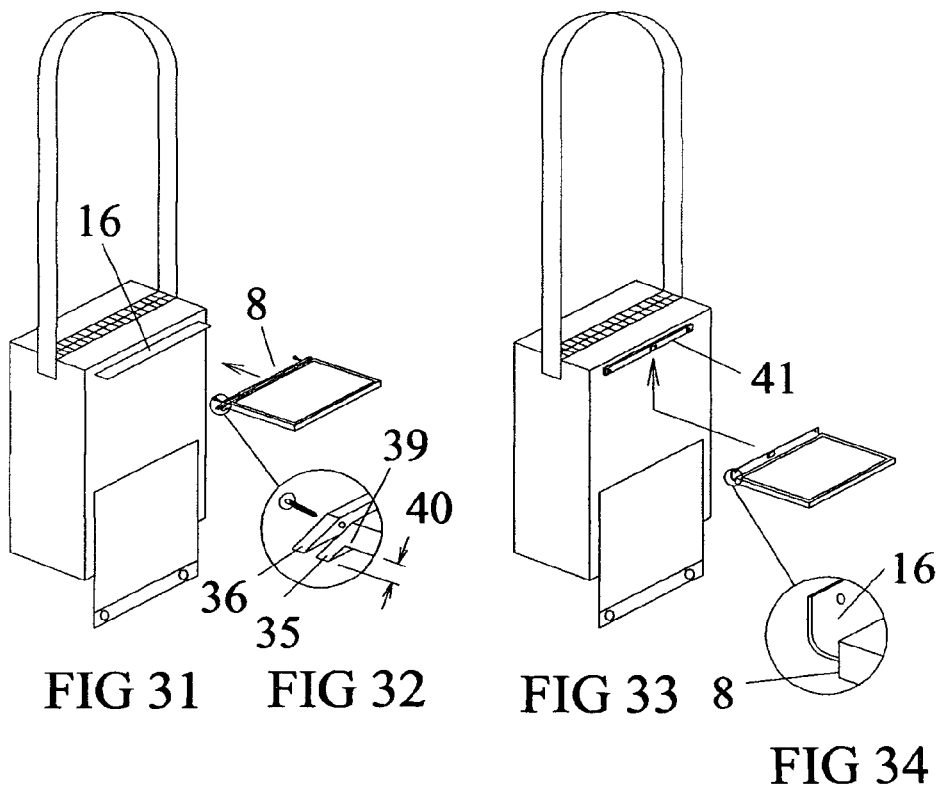

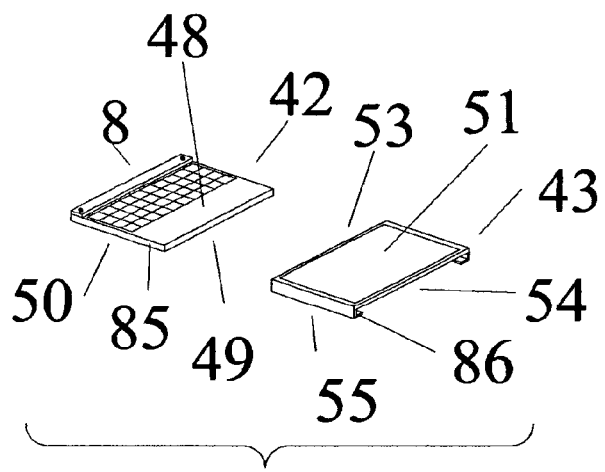
FIG. 35
FIG. 38
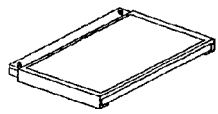
FIG. 36
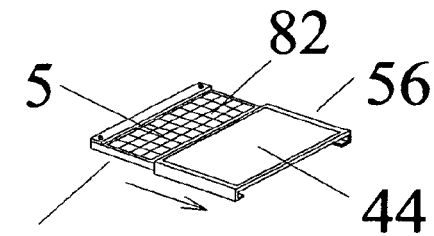
FIG. 37
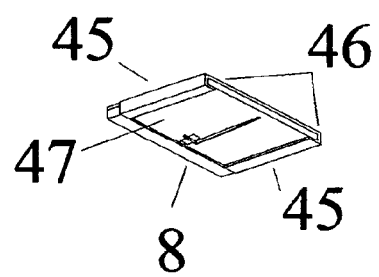
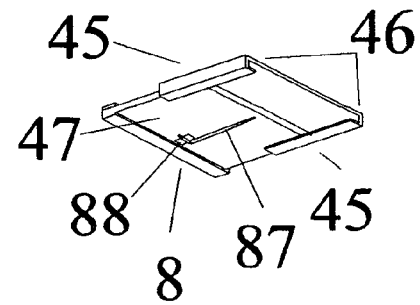
FIG. 39

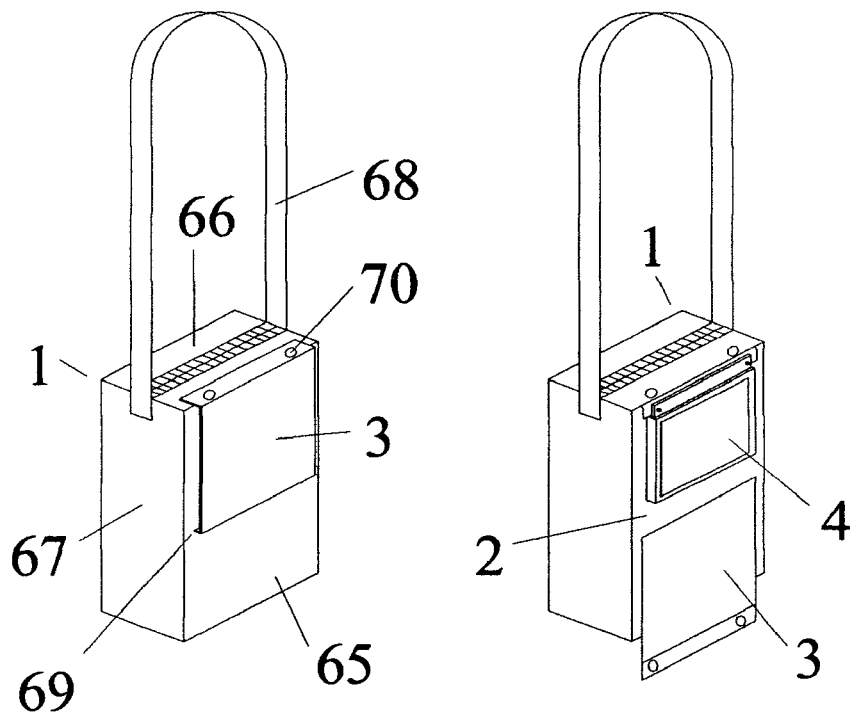
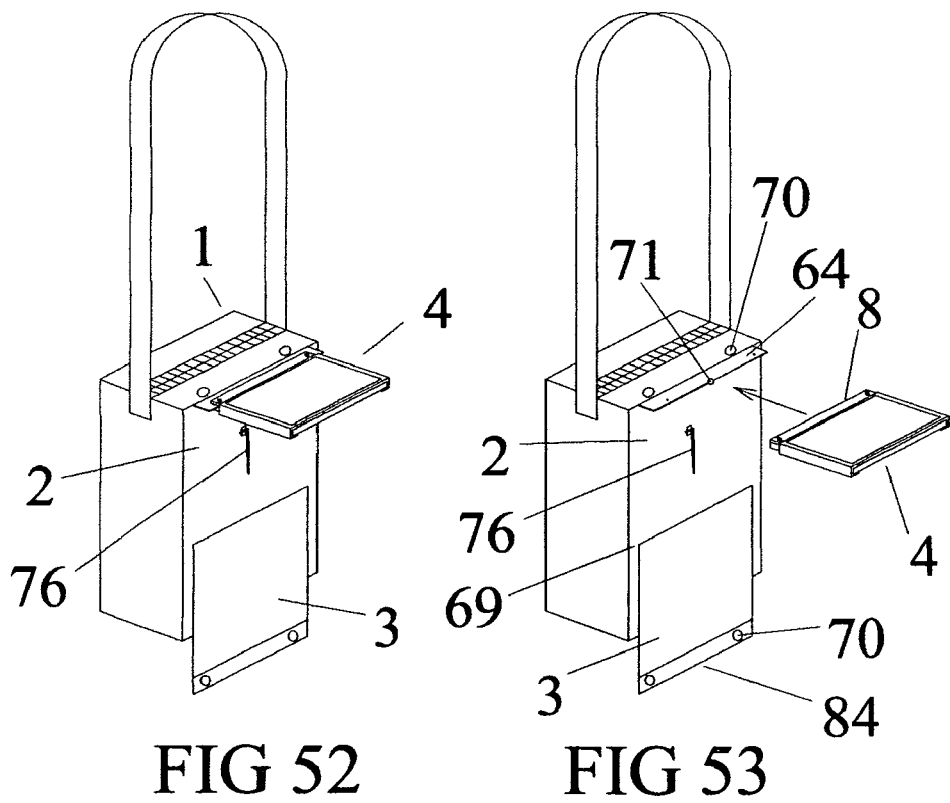
FIG 50  FIG 51
FIG 52  FIG 53

BAG COMPUTER ASSEMBLY WITH EXPOSABLE CONTROL SURFACE

CROSS-REFERENCE TO RELATED APPLICATIONS

This application claims the filing benefit under 35 U.S.C. §119(e) of U.S. Provisional Application No. 61/067,201, filed on Feb. 27, 2008, the entire teachings of which are incorporated herein by reference.

This application claims the filing benefit under 35 U.S.C. §119(e) of U.S. Provisional Application No. 61/125,861, filed on Apr. 30, 2008, the entire teachings of which are incorporated herein by reference.

This application is a Continuation-In-Part and claims the filing benefit under 35 U.S.C. §120 of pending U.S. application Ser. No. 11/796,920, filed May 1, 2007 now abandoned and incorporated herein by reference.

TECHNICAL FIELD

The present invention relates to a mobile computer meant to be operated while mounted on a computer bag.

BACKGROUND OF THE INVENTION

Portable and mobile computers are found in many sizes and shapes and with particular attributes to meet special circumstances.

There are single panel hand held computers with the display and controls found on one side (front) of the panel. Some are adapted for use with a touchpad which coincides with the display (touch screen).

One typical mobile computer is the "lap top" style where two panels are pivotally attached usually with one panel being the computer panel with the input/output devices and the other panel being the cover panel. In variations, the cover panel can include the display, keyboard or other input/output devices in addition to those found on the computer panel.

Another style has a single panel with the input/output devices on the back side (ie side opposite the display). These allow the display to occupy the entire front of the computer for better visual output.

Recently, a style of computer, application Ser. No. 11/796,920, has emerged where a single panel is provided edge attachments meant to match and work with a bag front attachment to allow the computer to pivot on the bag front. This allows the computer to be stored on the bag front where it is ready for quick use, cannot be dropped and is not as limited in size and shape as computer meant to be held in the hand.

The bag front mounted computer with edge attachments to match the bag front can be further improved by dividing it into two parts which slide relative to each other to expose a keyboard for use. In this way a keyboard can be present in reasonable size without reducing the size of the display. Additional controls can be found on the reverse side of one of the panels. This is the subject of this patent application.

BRIEF SUMMARY OF THE INVENTION

A bag computer is a bag with a computer pivotally attached to it so that the computer may lay flat against the bag's front wall for storage or be pivoted outward and upward into the line of sight of the operator/wearer for use. The Bag Computer Assembly with Exposable Control Surface includes a computer which is removable from the bag using complimentary attachments on the bag and computer which both join them and allow them to pivot relative to each other on a horizontal axis. Additionally, the computer has a retractable portion which may be slid away from the bag to disclose a control panel which included manual inputs such as a keyboard, electronic write pad or other controls for the computer. The computer may have further controls on the computer back side which may be used with the fingers while supporting the computer in use position on the bag.

The attachments between the bag and computer may be of any type which combine the two parts to produce the attributes of a bag computer. Examples include one or more hinge means, such as axle bearing hinges or flexible fabric flaps (short or long), with attachments such as Velcro, hooks, lateral entry channels, snaps, buttons, buckles, post and clip attachments (eg side release buckles), clips, molded plugs or sockets, or other attachments on either the bag or computer made to match and connect with a complimentary attachment on the opposite part. The attachment between the bag and computer may be one hinge half, such as a bearing or axle, on either the bag or computer and matching a complimentary half hinge on the opposite part. The axle may be removable. The a half hinges may be bearings (molded or comprised of a strap folded back into a bearing loop), or axles. The attachment may be a hanger to match a fixture on the bag front pivotally attachment to the computer with a hinge means. The attachment may be one or more clamps designed to match a hinge means such as a short flexible fabric flap wherein the clamp may be on either the computer or bag.

The computer is comprised of two parts: the attachment part which includes the attachments which connect the computer to the bag and; the sliding part which has sliding attachments to match the attachment part so it can slide on the attachments in a direction away form the attachments and bag. The sliding part may be either on top of or below the attachment part. The computer's display is located on the front of the part on top so that it is visible to the operator/wearer. The front of the part on the bottom includes the control panel with manual controls, such as a keyboard.

Additional controls may be located on the front of the top part with the display. Additional controls may be located on the back side of either the attachment part or the sliding part. Controls on the backside may be used with the operator's fingers and leave the display to fill the majority of the front surface of the part on top.

The computer may have provision for communication with the inside of the bag or with external receivers/transmitters.

The bag which matches the computer to form the bag computer may have its attachments for the computer on the front wall near the top wall. Alternatively, the attachments may be located on the top or side wall as long as they allow the computer to lay flat against the bag front or pivot out and up into the line of sight of the operator/wearer. The bag may include a cover which may be permanently attached to the bag front wall near its center so it can pivot out and up over the computer storage area and fasten to the top of the front or front of the top wall. The bag has access to its interior through an opening in its top wall. The bag may have provision, such as an opening for a wire or electrical plug, for electrical connection from the computer outside the bag through its surface to batteries, peripherals or computing equipment inside the bag.

BRIEF DESCRIPTION OF THE SEVERAL VIEWS OF THE DRAWING

FIG. 1 This is the bag computer, bag with computer pivotally attached, with the computer stored flat against the bag front and covered with the bag's cover.

FIG. 2 This is the bag computer, bag with computer pivotally attached, with the computer stored flat against the bag front with the cover folded down to expose the computer for use.

FIG. 3 This is the bag computer, bag with computer pivotally attached, with the computer pivoted away from the bag front and into the line of sight of the operator/wearer.

FIG. 4 This is the bag computer, bag with computer pivotally attached, with the computer pivoted away from the bag front and into the line of sight of the operator/wearer. Here, a retractable/sliding part of the computer is slid out to expose a keyboard or other controls for use.

FIG. 5 This figure shows that the bag computer is comprised of a computer and a bag attached with complimentary attachments which allow the computer to pivot on the bag from a storage position flat on the bag front to a position away front the bag front and in the line of sight of the operator/wearer.

FIG. 6 The computer part of the bag computer may have controls on its back side for use with the operator's fingers while supporting the computer on the bag.

FIG. 7 This figure shows that the attachments between the bag and the computer may be hinge mean, such as a flexible fabric flap, with a bracket mounted to it.

FIG. 8 This figure shows the back side of the computer with a bracket to match the bracket found on the bag.

FIG. 9 This figure shows that the attachments between the bag and the computer may be hinge mean, such as a flexible fabric flap, with the bag having a lateral entry attachment to match the computer, such as a channel, mounted to its distal edge.

FIG. 10 This figure is a magnified view of the computer's attachment edge which has a lateral entry attachment to match the bag, such as a channel, built into it.

FIG. 11 This figure shows that the attachments between the bag and the computer may be molded parts, such as plugs or sockets, with the bag having fixtures to match the computer mounted to its distal edge.

FIG. 12 This figure is a magnified view of the computer's attachment edge which has molded parts to match the bag built into it.

FIG. 13 This figure shows that the attachments between the bag and the computer may be an axle and bearing hinge mounted to the bag and including attachments to match the computer.

FIG. 14 This figure is a magnified view of the computer's attachment edge which has molded parts to match the bag's attachments built into it.

FIG. 15 This figure is a magnified view of the bag's attachment which included the axle bearing hinge means and the attachments to match the computer.

FIG. 16 This figure shows that the attachments between the bag and the computer may be an axle and bearing hinge with half of the hinge assembly found on the bag and half of the hinge assembly found on the computer. The two halves are combined with a removable axle.

FIG. 17 This figure is a magnified view of the computer's attachment edge which has a half hinge bearing to match the bag's half hinge.

FIG. 18 This figure shows that the attachments between the bag and the computer may be an axle found on the computer and flexible fabric straps with attachments found on the bag, the straps fold back on and attaching to themselves or the bag to form a bearing for the computer's axle.

FIG. 19 This figure is a magnified view of the computer's attachment edge which has one or more attachment axles found on it.

FIG. 20 This figure shows that the attachments between the bag and the computer may be post and clip attachments with male part consisting of a post to strengthen and align the attachments and clips to hold the attachments in place and the female part consisting of a matching socket. One of the attachments, on the bag or computer, pivots.

FIG. 21 This figure is a magnified view of the bag's top front panel which has one or more pivoting post and clip attachments found on it.

FIG. 22 This figure shows the back side of the computer with post and clip attachments.

FIG. 23 This figure is a magnified view of the computer's attachment edge area which has one or more post and clip attachments found on it.

FIG. 24 This figure shows that the attachments between the bag and the computer may be buttons wherein the bag had a short flexible fabric flap with buttons holes in it and the computer has buttons molded into its attachment edge area.

FIG. 25 This figure shows the back side of the computer with buttons molded into its attachment edge area.

FIG. 26 This figure is a magnified view of the computer with buttons molded into its attachment edge area.

FIG. 27 This figure shows that the attachments between the bag and the computer may be clamp on the computer attachment edge adapted to match a pivoting short flexible fabric flap found on the bag.

FIG. 28 This figure is a magnified view of the computer's attachment edge with a clamp consisting of two semi-flexible jaws adapted to match a short flexible fabric flap found on the bag.

FIG. 29 This figure shows that the attachments between the bag and the computer may be a clamp on the computer attachment edge wherein the clamp consists of a pivoting eccentric and lever to match and clamp in place a short flexible fabric flap found on the bag.

FIG. 30 This figure is a magnified view of the computer's attachment edge with a clamp consisting of a pivoting eccentric and lever to match and clamp in place a short flexible fabric flap found on the bag.

FIG. 31 This figure shows that the attachments between the bag and the computer may be a clamp on the computer attachment edge which has one removable jaw and matches a short flexible fabric flap on the bag.

FIG. 32 This figure is a magnified view of the computer's attachment edge with a clamp which has one removable jaw and is angled and has an overhang to assist in the movement of the computer on the bag.

FIG. 33 This figure shows that the attachments between the bag and the computer may be a clamp on the bag which is adapted to match and clamp to a short flexible fabric hinge means/flap on the computer's attachment edge.

FIG. 34 This figure is a magnified view of the computer's attachment edge with a short flexible fabric hinge means flap to match the clamp on the bag and pivotally hold the bag and computer together.

FIG. 35 Here shown in the computer divided into its attachment part and its sliding part.

FIG. 36 This figure shows the computer with the two parts assembled and in the closed position with the sliding part, with display, as the top part and having edges with sliding attachments enclosing the bottom attachment part, with controls.

FIG. 37 This figure shows the computer with the two parts assembled and in the open position with the sliding part, with display, as the top part and having edges with sliding attachments enclosing the bottom attachment part, with controls.

FIG. 38 This figure shows the back side of the computer with the attachment parts and sliding part assembled and in the closed position.

FIG. 39 This figure shows the back side of the computer with the attachment parts and sliding part assembled and in the open position. The back side of the top attachment part is left exposed.

FIG. 50 This figure shows the bag meant to attach to the computer. It has the computer in stored position with the cover closed.

FIG. 51 This figure shows the bag meant to attach to the computer. The cover is down/open with the computer pivoted flat against the bag front with the computer front, with display, facing outward.

FIG. 52 This figure shows the bag meant to attach to the computer. The cover is folded down/open with the computer pivoted out and into the line of sight of the operator/wearer and with the computer front, with display, facing the operator's/wearer's face.

FIG. 53 This figure shows the bag meant to attach to the computer. The cover is down/open with the computer detached from the bag. The bag's attachment is, in this case, a short flexible fabric flap meant to attach to the computer's attachment edge.

DETAILED DESCRIPTION OF THE INVENTION

Figure 40:
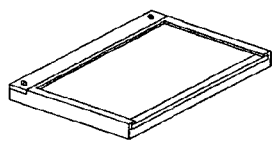
FIG. 40 In this figure the computer, in closed position, has the sliding part, with display, as the top part. The bottom attachment part, with controls, has edges with sliding attachments enclosing the sliding part edges.

A bag computer is a bag with a computer assembly, including input/output devices such as a display and graphic user input device, mounted to the exterior of the bag so it may pivot horizontally from a storage position flat against the bag's front wall to a position away from the bag's front wall where the wearer/operator may view it. If the computer assembly does not include a computing unit, the computer assembly may be called a "display panel" or "input output" panel.

The Bag Computer Assembly with Exposable Control Surface is a computer assembly meant for mounting on the exterior of a bag so that it can pivot along a horizontal axis over the bag's front wall. This computer assembly is comprised of two sub panels, the attachment panel and the sliding panel, which are assembled with sliding attachments and include an electrical connection between the two panels. As shown in FIG. 1, the computer assembly, when mounted to the bag 1, is stored flat against the bag front wall 2 and may be covered with a cover, such as a cover flap 3. Shown in FIG. 2, when the cover is repositioned, the computer assembly 4, also here referred to as the "computer", is exposed for use. In FIG. 3, the computer is pivoted away from the bag front wall with its display facing up, properly oriented and in the line of sight of the operator/bag wearer so the display can be viewed and used. The pivoting may be accomplished using one or more hinge means, such as an axle bearing hinge or a flexible fabric flap, which may be capable of holding the angular position between the computer and bag front wall with, for example, a ratchet or friction hinge or with a display panel prop assembly 76 designed to extending between the bag front wall 2 and computer assembly back side. Show in FIG. 4, if there is need for manual input controls, such as a keyboard 5, electronic write pad or other controls, they may be found on a control surface 82 which may be exposed for use by sliding a sliding panel 6 away from the bag front wall.

FIG. 5 shows that, because the computer and bag have different life times, the computer and bag may be separated for replacement or upgrading. The computer assembly 4 is of panel-like shape having front side 78 with display 44, an opposite back side which may have controls, an attachment edge 79 closest to the bag and with one or more computer mounting attachments 83 which are complimentary to bag mounting attachments on the bag to pivotally connect the bag and computer, a distal edge 80 opposite the attachment edge and two side edges 81. The bag and computer are pivotally joined with complimentary mounting attachments, the bag mounting attachment found on the bag 7 and the computer mounting attachment 83 found on the computer's attachment edge. The combination of the bag mounting attachment and the computer mounting attachment may also be called a "pivoting computer equipment mount" (PCEM).

FIG. 6 shows the back side 14 of the computer 4 where controls may be found and available for use when the operators holds the computer on the bag front wall. These controls may include one or more touch pads 9, clickers 10, buttons 11, slides 12 or other means to communicate with the computer with the hands. The back side of the computer assembly may have one or more display panel prop attachment fixtures, such as holes, sockets 77, clips, sliding fixtures, base or bearing to pivotally and semi-permanently hold a display panel prop bar or other attachment to match and be complimentary to a display panel prop bar which may be extended between the bag front wall and display panel back and used to support the computer at one or more angles relative to the bag front wall. The display panel prop attachment fixture may be a base which includes a display panel prop bar semi-permanently and pivotally attached to it and there may be a recessed area provided in the computer assembly back side to store a display panel prop bar, if present, when not in use. The display panel prop attachment fixtures may be disposed on the attachment panel back side.

The computer is removable mounted to the bag with one or more computer mounting attachments complimentary to bag mounting attachments found on the bag and which both attach the computer and bag together and allow them to pivot relative to each other along a horizontal axis on the bag. The actual character of the computer and bag mounting attachments may vary although all combinations serve to pivotally attach the computer to the bag so that the computer may store flat against the bag front wall or may be pivoted out into the line of sight of the operator/wearer. The following are a few examples of types of mounting attachments between the bag and computer.

FIGS. 7 and 8 show the computer mounting attachments may be comprised of a computer bracket 13 on the computer back side 14 and designed to match a bag mounting attachment such as a bracket 15 pivotally attached to the bag with, for example, a flexible fabric flap 16 or other hinge means.

In FIGS. 9 and 10 the computer mounting attachments may be comprised of a lateral entry attachment such as one or more channels 17, tracks, sliding guides, molded parts, lateral hooks or other sliding guides on the computer attachment edge 8 which matches a channel fixture 18 or other complimentary attachment pivotally attached to the bag with, for example, a short flexible fabric flap 16 or other hinge means.

FIGS. 11 and 12 show that the computer mounting attachments may be comprised a hinge means 19 on the computer attachment edge 8 which also includes attachments, such as plugs 20, sockets, single or double hanger blades or other attachments, which match and fit into complimentary bag mounting attachments 21 on the bag.

FIGS. 13, 14 and 15 show, conversely, that the hinge means 19 may be on the bag and include plugs, sockets 22 or other attachments which match attachments, such as hooks or plugs 20, found on the computer's attachment edge 8.

In FIGS. 16 and 17 the mounting attachments is comprised of half a hinge 23 found on the bag and the complimentary half hinge 24 found on the computer's attachment edge 8. The half hinges may be bearings with a removable axle 25 joining the computer hinge and bag hinge together. The half hinges may include both bearings and hinges. There may be one or more half hinge pairs. The bearing half hinge may be of flexible material and split lengthways so complimentary axle half hinge can snap into the bearing without a separate axle.

FIGS. 18 and 19 show that the computer mounting attachments may be comprised two parts near the right and left edges of the computer's attachment edge. The parts may be half hinge axles 26 extending from the attachment edge or the side edges adjacent to the attachment edge 8 and meant to match bag bearings, such as a molded or sewn bearing or straps 27 which fold back on and attach to themselves to form the bearing loop.

FIGS. 20, 21, 22 and 23 show the mounting attachments may be one or more post and clip attachments, such as side release buckles, with male 28 and female 29 parts attached to the bag and computer and with the bag's mounting attachment connected to the bag in a way to allow the attachments and computer to pivot. The computer attachments may be molded into the computer 30 body. Other possible attachment means which can be substituted for post and clip attachments include zipper or Velcro.

In FIGS. 24, 25 and 26 the computer mounting attachments is two or more buttons 31 molded into the computer body near its attachment edge 8 and meant to match button holes 32 found on a pivoting flexible fabric flap 16 which forms the bag mounting attachment. Other possible attachment means which may be substituted for buttons include snaps, buckles, hooks, clips, side release buckles, or other attachment means.

FIGS. 27 and 28 show that the computer mounting attachments may be one or more clamps meant to match a flexible fabric hinge means, such as a matching short flap 16, found on the bag. The clamp may be a slot 33 in the attachment edge 8 of the computer which may be tightened with a screw 34 or other tightening means.

In FIGS. 29 and 30 the computer mounting attachments is a clamp on the computer attachment edge 8 comprised of a immobile jaw 35 and a pivoting jaw with an movable jaw comprised of an eccentric lobe 37 or small lever which can be pivoted and a larger lever arm 38 to tighten the small lever and clamp onto the bag's flexible fabric hinge means flap 16.

FIGS. 31 and 32 shows that the computer mounting attachments may be a clamp on the computer attachment edge 8 to match the bag's short flexible fabric hinge means flap 16. The clamp may be shaped, curved, angled 39, or have an overhang 40 in order to facilitate the mounting and pivoting of the computer on the bag. The clamp may be comprised of one immobile jaw 35 and one removable jaw 36.

FIGS. 33 and 34 show, conversely, that the computer mounting attachments on the computer's attachment edge 8 may be one or more flexible fabric attachment flaps 16 meant to match and clamp 41 into a clamp found on the bag front wall. Instead of a clamp attachment, a zipper, Velcro, buttons, button holes, snaps, side release buckles or other fasteners may be substituted.

As shown in FIGS. 35, 36 and 37, the computer assembly is comprised of two parts which slide relative to each other thus allowing controls on the control surface 82 to be exposed for use. One part, the attachment panel 42, has the computer's mounting attachments, described above, to pivotally attach the computer to the bag. The other part, the sliding panel 43, slides on the attachment panel. When the computer is pivoted approximately perpendicular to the bag front wall, sliding moves the sliding panel away from the bag front wall. In normal operation, the two parts are always in contact and do not fully separate.

The attachment panel is panel-like with a front side 48 facing up toward the operator/wearer's face when the computer is mounted on the bag and with the computer pivoted out approximately perpendicular to the bag front wall. It has an opposite back side. The edge closest to the bag when in this position, the one including the mounting attachments, is the attachment edge 8 and this has an opposite distal edge 49. There are two side edges 50 to the right and left as viewed by the operator/wearers. The attachment panel also has one or more sliding attachments, called attachment panel sliding attachments 85, to match and complimentary to sliding attachments, called sliding panel sliding attachments, located on the sliding panel.

The sliding panel is panel-like with a front side 51 facing up toward the operator/wearers face when the computer is mounted on the bag and with the computer pivoted out approximately perpendicular to the bag front wall. It has an opposite back side. It has a proximal edge 53 closest to the bag front wall when in this position and this has an opposite distal edge 54. There are two side edges 55 to the right and left as viewed by the operator/wearers. The sliding panel also has one or more sliding attachments, called sliding panel sliding attachments 86, to match and complimentary to sliding attachments, called attachment panel sliding attachments, located on the attachment panel.

When the two parts are assembled, they form the computer which is closed, shown in FIG. 36, when the front side of one part is against the back side of the other. The computer is open, shown in FIG. 37, when the parts have been slid so that the front sides of the two parts are both at least partially visible to the operator/wearer. In normal operation, the two parts are always in contact and do not fully separate. The top part 56 is the part with its front side visible then the computer is closed. The bottom part 57 underneath it and may not be visible when the computer is closed.

The display 44 is found on the front side of the top part whether it is the sliding panel or the attachment panel. The control surface 82, including controls such as a keyboard 5, electronic write pad or other manual input device is found on the front side of the bottom part whether it is the sliding panel or the attachment panel. Thus, if the sliding panel is on top, the display may be slid away from the bag front wall and the controls on the control surface will be found on the front side of the bottom attachment panel between the display and the bag front wall. Conversely, if the sliding panel is on the bottom, then the controls on the control surface may be slid away from the bag front wall and the display will be found between the control surface and the bag front wall.

The sliding panel may be the top part. In this arrangement the sliding panel side edges may form or have fastened to them channels, hooks, rollers, tracks, molded parts, sliding guides or other sliding attachments, called sliding panel sliding attachments, to match and complimentary to sliding attachments, called attachment panel sliding attachments, located on the attachment panel. FIGS. 38 and 39 show a back side view of the computer assembly with the attachment edge 8 to the left. It can be seen that the sliding panel side edges 45 may be shaped to form sliding attachment 46 and enclose the edges of the attachment panel so that most of the attachment panel back side 47 is exposed whether the computer is open or closed. When the sliding panel side edges enclose the attachment panel edges, the sliding panel side edges may have a handle, ribbing, knurling or other grip to assist in sliding the sliding panel. The sliding panel may completely enclose the attachment panel except for where it attaches to the bag. Also shown is a different form of the display panel prop assembly wherein the display panel prop bar 87 is pivotally attached to the display panel back side with a display panel prop attachment fixture 88.

Figure 41:
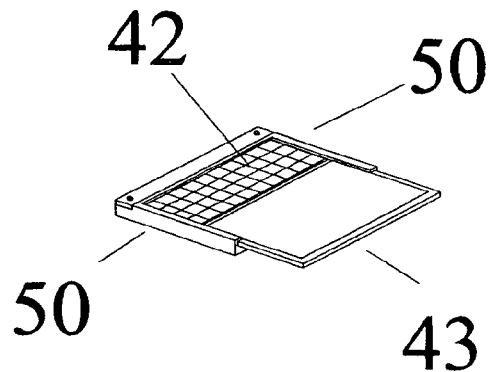
FIG. 41 In this figure the computer, in open position, has the sliding part, with display, as the top part. The bottom attachment part, with controls, has edges with sliding attachments enclosing the sliding part edges.

Instead, as shown in closed view FIG. 40 and open view FIG. 41, the attachment panel 42 side edges 50 may form or have fastened to them the channels, hooks, rollers, tracks, molded parts, sliding guides or other sliding attachments, called attachment panel sliding attachments, to match and complimentary to sliding attachments, called sliding panel sliding attachments, located on the sliding panel 43. The attachment panel side edges may enclose the edges of the sliding panel so that most of the front side of the sliding panel is exposed for viewing even with the computer closed. When the sliding panel side edges are enclosed by the attachment panel edges, the sliding panel distal edge may have a handle, ribbing, knurling or other grip to assist in sliding the sliding panel.

Figure 42:
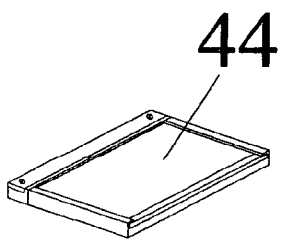
FIG. 42 In this figure the computer, in closed position, has the attachment part, with display, as the top part. The bottom sliding part, with controls, has edges with sliding attachments enclosing the attachment part edges.
Figure 43:
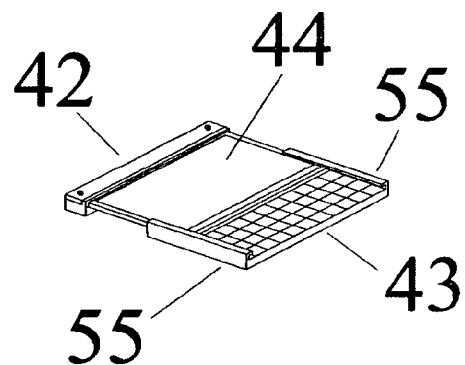
FIG. 43 In this figure the computer, in open position, has the attachment part, with display, as the top part. The bottom sliding part, with controls, has edges with sliding attachments enclosing the attachment part edges.

As shown in closed view FIG. 42 and open view FIG. 43, the sliding panel may be the bottom part. In this arrangement the sliding panel 43 side edges 55 may form or have fastened to them channels, hooks, rollers, tracks, molded parts, sliding guides or other sliding attachments, called sliding panel sliding attachments, to match and complimentary to sliding attachments, called attachment panel sliding attachments, located on the attachment panel. 42. The sliding panel edges may be shaped to form sliding attachments which enclose the edges of the attachment panel but leave the front side of the top part, including the display 44, exposed for viewing. When the sliding panel side edges enclose the attachment panel edges, the sliding panel side edges may have a handle, ribbing, knurling or other grip to assist in sliding the sliding panel.

Figure 44:
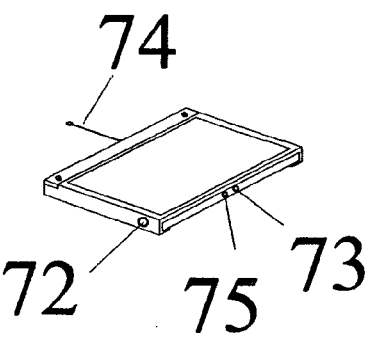
FIG. 44 In this figure the computer, in closed position, has the attachment part, with display, as the top part and includes edges with sliding attachments enclosing the edges of the bottom sliding part which includes controls.
Figure 45:
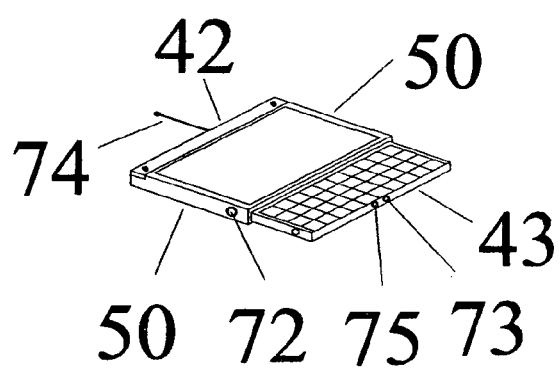
FIG. 45 In this figure the computer, in open position, has the attachment part, with display, as the top part and includes edges with sliding attachments enclosing the edges of the bottom sliding part which includes controls FIG. 46 Shown here is the front side of the computer, in open position, with controls on the front of the top part in addition to the display.

Instead, as shown in closed view FIG. 44 and open view FIG. 45, the attachment panel 42 side edges 50 may form or have fastened to them the channels, hooks, rollers, tracks, molded parts, sliding guides or other sliding attachments, called attachment panel sliding attachments, to match and complimentary to sliding attachments, called sliding panel sliding attachments, located on the sliding panel 43, shown here as the bottom part. The attachment panel side edges may be shaped to form sliding attachments which enclose the edges of the sliding panel. When the sliding panel side edges are enclosed by the attachment panel edges, the sliding panel may have on its distal edge a handle, ribbing, knurling or other grip to assist in sliding the sliding panel. The attachment panel may completely enclose the sliding panel except for where the sliding panel is pulled out from the attachment panel.

In any of the various arrangements of the computer assembly side edges, the computer assembly side edges may be formed to assist in fitting the computer to the bag front even if the bag's front has some bulge due to a large cargo load in the bag. For example, when the computer assembly is in storage position flat against the bag front, the computer assembly side edges may extend toward the bag front beyond the general plane of the computer assembly back side so to accommodate any outward curvature of the bag front.

Instead of the two parts being joined with complimentary sliding attachments at the panel side edges, the two parts may be joined with complimentary attachment panel sliding attachments and sliding panel sliding attachments such as channels, hooks, rollers, tracks, molded parts, sliding guides or other sliding attachments located between the back side of the top part and the front side of the bottom part.

Also shown in FIGS. 44 and 45, the computer assembly, in any of the preceding arrangement, may include a locking mechanism such as a slide or button 72 to regulate the movement of the attachment panel and the sliding panel relative to each other and to keep the parts open or closed relative to each other. There may be stops to keep the two parts in the assembled configuration. There may be means for external communication. For example, the computer may include radio communication or there may be an infrared communicator 73 on the distal edge of the attachment panel or sliding panel to communication with other external transmitters/receivers. The distal edge of the attachment panel and/or sliding panel may include a camera 75 or one or more other input sensor. The computer may include global positioning system (GPS). The computer may also have a means for communicating with the interior of the bag. There may be an electrical connection, such as a wire lead 74 with necessary connector, such as a plug, to electrically connect the computer through the bag front wall or to a plug on the bag's surface to make a connection to other computing equipment, such as the computing unit, peripherals or batteries, located in the bag's interior. The connection may be wireless.

The computer assembly's computing equipment, including computing unit, batteries and communication equipment, may be located in the attachment panel or in the sliding panel or in both. Alternatively, the computing equipment may be separately located inside the bag with communication between the computer assembly and the computing equipment in the bag's interior being via wire lead or wirelessly as described above. In this configuration the computer assembly may also be called a bag computer "input/output panel" or "display panel" which is used in conjunction with the bag and with computing equipment located on the interior of the bag.

The attachment panel and sliding panel communicate with each other with an electrical connection, such as a wire connection, sliding contact or wirelessly. There may be a void in one or both of these panels or between the two panels to allow a connecting wire, such as a ribbon wire, to move smoothly and to be stored whether the computer is open or closed.

Figure 46:
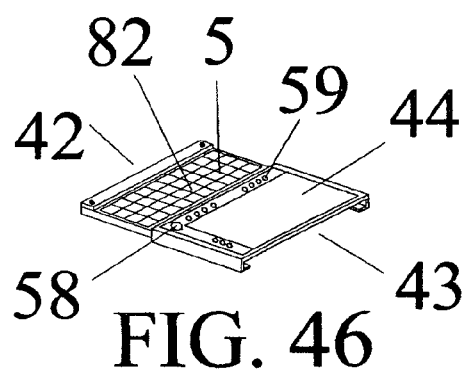

Shown in FIG. 46, there may be controls on the front side of the top part whether it is the sliding panel 43 or the attachment panel 42. This is where the display 44 is located. Controls may include touch screen, buttons 59, slides, pointing device 58 or other means to control the computer.

There are controls on the control surface 82 found on the front side of the bottom part whether it is the sliding panel 43 or the attachment panel 42. These controls may be manual input controls such as a keyboard 5, electronic write pad, buttons, slides, pointing device or other means to control the computer and can be operated with the hands while the computer is mounted to the bag.

Figure 47:
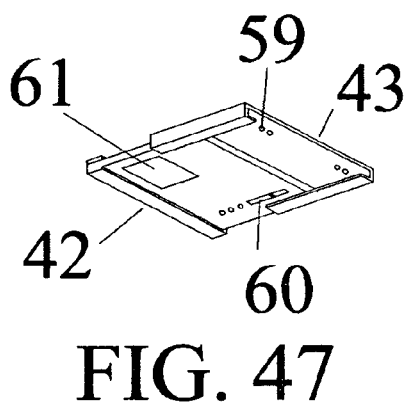
FIG. 47 Shown here is the back side of the computer, in open position, with controls on the back side of the attachment part and sliding part.

Show in FIG. 47, there may be controls on the back side of either the attachment panel 42 or sliding panel 43. These controls may be manual input controls and are positioned and oriented so that the operator can use them with his fingers while supporting the computer in his hands. The controls may include one or more pointing devices, touch pads 61, buttons 59, slides 60 or other means to control the computer. There may be a touchpad located on the backside near one side edge of the computer assembly for use with the fingers on one hand. Additionally, there may be graphic user interface (GUI) clickers on the back side near the opposite side edge of the computer assembly for use with the fingers of the opposite hand. In this way the touchpad/clicker GUI interface may be used with two hands for faster use.

Figure 48:
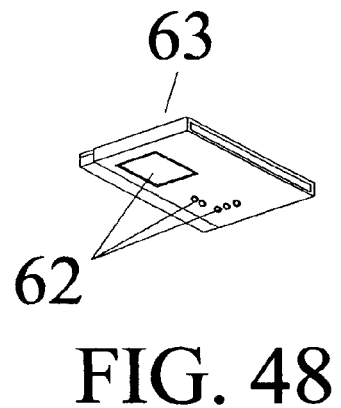
FIG. 48 Shown here is the back side of the computer, in closed position, with controls on the back side of the attachment part available through openings in the sliding part which encloses the attachment part.
Figure 49:
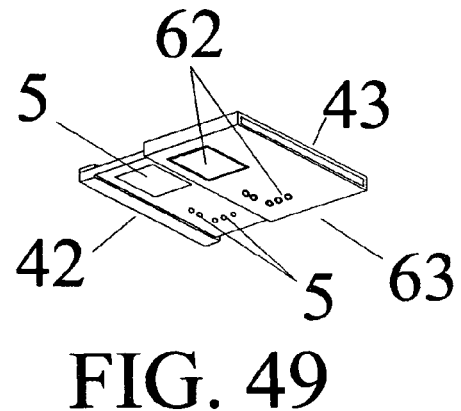
FIG. 49 Shown here is the back side of the computer, in open position, with controls on the back side of the attachment part available for use and the sliding part, which encloses the attachment part when closed, moved out of the way.

As shown in FIG. 48, computer assembly back side view closed position, and FIG. 49, computer assembly back side view open position, if one of the parts (attachment panel 42 or sliding panel 43) is enclosed by the other part, there may be openings 62 in the back side 63 of the enclosing part to gain access to the controls 5 on the bottom of the enclosed part when the two parts are slid closed. The openings may serve as finger guides and be shaped to aid in finding and using the back side keys whether the computer is open or closed.

A bag 1, shown in FIGS. 50, 51, 52 and 53, may be included which has bag mounting attachments 64 on the bag's exterior surface to match the computer mounting attachments on the attachment edge 8 of the computer 4 and positioned and aligned to allow the computer to pivot along a horizontal axis on the bag. Thus mounted the computer may lay flat against the bag front wall 2 for storage, FIG. 51, or may be pivoted out into the line of sight of the operator/wearer, FIG. 52, when the computer is used.

The bag is comprised of a front wall 65, top wall 66 with opening with optional closure to gain access to the bag's interior, a bottom wall, side walls 67 and a back wall. The bag has a strap 68 for the operator/wearer to carry the bag for transport and to suspend or secure the bag on, for example, the operator's/wearer's shoulder, torso or waist while leaving the hands free for using the computer attached to the bag. The bag mounting attachments to match the computer mounting attachments may be found on the bag's front wall proximal to the top wall so the computer may be positioned as close as possible to the operator/wearer's eyes when pivoted out into the line of sight of the operator for use. The bag's mounting attachments may be located on or be an extension of the bag's top wall or side walls as long as they allow the attached computer to lay flat against the bag front wall for storage or pivot horizontally out into the line of sight of the operator/wearer for use.

The bag mounting attachments to match the computer may be otherwise positioned on the front wall to pivotally hold on a horizontal axis and accommodate the computer for storing and using.

The bag may have a cover, such as a cover flap 3, to cover, conceal, protect and secure the computer in its storage place while on the bag front wall. The cover flap may be permanently and pivotally attached, for example by sewing or riveting, to the bag front wall near its center 69. In this position the cover flap may be pivoted up and over the computer stored flat against the bag front wall and having fasteners 70 near the distal edge 84 of the cover to close the cover to matching fasteners on the top of the front wall or front of the top walls. The cover may be rigid or semi-rigid and be shaped or molded to fit the computer.

Alternatively, the cover may be permanently and pivotally attached to the top of the back wall, to the top wall or to the top of the front wall and fold down over the bag front wall and computer stored there.

The bag may include one or more display panel prop assemblies 76, such as a pivoting rigid or semi rigid post found on the exterior of the bag front wall, which match fittings on the display panel back side and are used to support the computer at one or more angles relative to the bag front wall. Instead, the bag front may have one or more bag front prop attachment fixtures, such as holes, sockets, clips, sliding fixtures, bearing or base to pivotally and semi-permanently hold a display panel prop bar or other attachment to match and be complimentary to a display panel prop bar which may be extended between the bag front wall and display panel back side and used to support the computer at one or more angles relative to the bag front wall.

If the computer has an electrical connection to lead to the interior of the bag, the bag may have an opening 71 to match any wire lead from the computer or may have the necessary electrical connection, such as a plug or other connector, in one of the front, top, side or other bag walls to allow the computer to communicate with batteries, peripherals or other computer equipment stored in the interior of the bag.

The invention claimed is:

1. A computer assembly for mounting on the exterior of a bag, the exterior of the bag having a front wall and bag mounting attachments, the computer assembly comprising:
   a) an attachment panel including:
      a front side, an opposite back side, an attachment edge closest to the front wall of the bag when mounted, an opposite distal edge and two side edges;
      a display disposed on said front side of said attachment panel;
      one or more computer mounting attachments disposed on said attachment edge of said attachment panel, said computer mounting attachments complimentary to the bag mounting attachments on the bag;
      attachment panel sliding attachments disposed on said attachment panel;

b) a sliding panel including:
- a front side, an opposite back side, a proximal edge closest to the front wall of the bag when mounted, an opposite distal edge, and two side edges;
- a control surface including one or more controls, said control surface disposed on said front side of said sliding panel;
- sliding panel sliding attachments disposed on said sliding panel, said sliding panel sliding attachments complimentary to said attachment panel sliding attachments on said attachment panel; and c) an electric connection between said attachment panel and said sliding panel.

2. The apparatus of claim 1 further comprising a computing unit disposed in one or both of said attachment panel or said sliding panel.

3. The apparatus of claim 1 further comprising manual input controls disposed on the back side of the attachment panel and/or on the back side of the sliding panel and positioned and oriented so that the operator can use them with his fingers while supporting the computer assembly in his hands.

4. The apparatus of claim 1 further comprising a locking mechanism to regulate the movement of the attachment panel and the sliding panel relative to each other.

5. The apparatus of claim 1 further comprising one or more input sensors disposed on the distal edge of the attachment panel and/or the distal edge of the sliding panel.

6. The apparatus of claim 1 further comprising an electrical connection leading from the attachment edge of the attachment panel and designed to pass through the bag's front wall and to the interior of the bag to which the computer assembly is mounted.

7. The apparatus of claim 1 further comprising a bag with a front wall and bag mounting attachments on the exterior of the bag and complimentary to the computer mounting attachments and positioned and aligned to allow the computer assembly to alternatively store flat against the bag's front wall or pivot on a horizontal axis into the line of sight of the operator of the computer assembly and wearer of the bag.

8. The apparatus of claim 1 further comprising one or more display panel prop attachment fixtures on the computer assembly back side designed to match and be complimentary to one or more display panel prop bars disposed between the exterior of the bag front wall and the computer assembly back side and used to assist in holding the computer assembly's display in one or more angular positions relative to the bag front wall.

9. A computer assembly for mounting on the exterior of a bag, the exterior of the bag having a front wall and bag mounting attachments, the computer assembly comprising:

a) an attachment panel including:
- a front side, an opposite back side, an attachment edge closest to the front wall of the bag when mounted, an opposite distal edge and two side edges;
- a control surface including one or more controls, said control surface disposed on said front side of said attachment panel;
- one or more computer mounting attachments disposed on said attachment edge of said attachment panel, said computer mounting attachments complimentary to the bag mounting attachments on the bag;
- attachment panel sliding attachments disposed on said attachment panel;

b) a sliding panel including:
- a front side, an opposite back side, a proximal edge closest to the front wall of the bag when mounted, an opposite distal edge, and two side edges;
- a display disposed on said front side of said sliding panel;
- sliding panel sliding attachments disposed on said sliding panel, said sliding panel sliding attachments complimentary to said attachment panel sliding attachments on said attachment panel; and c) an electric connection between said attachment panel and said sliding panel.

10. The apparatus of claim 9 further comprising a computing unit disposed in one or both of said attachment panel or said sliding panel.

11. The apparatus of claim 9 further comprising manual input controls disposed on the back side of the attachment panel and/or the back side of the sliding panel and positioned and oriented so that the operator can use them with his fingers while supporting the computer assembly in his hands.

12. The apparatus of claim 9 further comprising a locking mechanism to regulate the movement of the attachment panel and the sliding panel relative to each other.

13. The apparatus of claim 9 further comprising one or more input sensors disposed on the distal edge of the attachment panel and/or the distal edge of the sliding panel.

14. The apparatus of claim 9 further comprising an electrical connection leading from the attachment edge of the attachment panel and designed to pass through the bag's front wall and to the interior of the bag to which the computer assembly is mounted.

15. The apparatus of claim 9 further comprising a bag with a front wall and bag mounting attachments on the exterior of the bag and complimentary to the computer mounting attachments and positioned and aligned to allow the computer assembly to alternatively store flat against the bag's front wall or pivot on a horizontal axis into the line of sight of the operator of the computer assembly and wearer of the bag.

16. The apparatus of claim 9 further comprising one or more display panel prop attachment fixtures on the computer assembly back side designed to match and be complimentary to one or more display panel prop bars disposed between the exterior of the bag front wall and the computer assembly back side and used to assist in holding the computer assembly's display in one or more angular positions relative to the bag front wall.

* * * * *